(12) United States Patent
Haruki

(10) Patent No.: US 6,452,630 B1
(45) Date of Patent: Sep. 17, 2002

(54) METHOD FOR ARRANGING IMAGE NUMBERS

(75) Inventor: Toshinobu Haruki, Kyotanabe (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 0 days.

(21) Appl. No.: 09/094,637

(22) Filed: Jun. 15, 1998

(30) Foreign Application Priority Data

Jun. 16, 1997 (JP) .............................................. 9-158262

(51) Int. Cl.[7] .................................................. H04N 5/76
(52) U.S. Cl. ..................................................... 348/231
(58) Field of Search ................................ 348/207, 220, 348/231, 232, 233; 707/200, 100, 104; 386/120, 38, 121; H04N 5/76

(56) References Cited

U.S. PATENT DOCUMENTS

| | | | | |
|---|---|---|---|---|
| 5,563,655 A | * | 10/1996 | Lathrop ...................... | 348/231 |
| 5,581,295 A | | 12/1996 | Prowak ....................... | 347/237 |
| 5,806,072 A | * | 9/1998 | Kuba et al. ................. | 707/200 |
| 5,899,581 A | * | 5/1999 | Kawamura et al. ......... | 386/120 |
| 5,905,528 A | * | 5/1999 | Kodama ...................... | 348/220 |

OTHER PUBLICATIONS

English abstract of Japanese Publication No. 8–263632 issued Oct. 11, 1996.

* cited by examiner

*Primary Examiner*—Tuan Ho
(74) *Attorney, Agent, or Firm*—Armstrong, Westerman & Hattori, LLP

(57) ABSTRACT

In an image number arranging method, a CPU reads all image file names out of a memory card recorded with image files, and enters these file names to an entry table so that they are arranged in a power ascending order. The CPU then calculates respective distances for the file numbers, and detects two image file names assuming maximum in the distance. The file names arranged at and before one of the two image file names and the file names arranged at and after the other of the two image file names are replaced with each other, thereby being entered to the entry table.

10 Claims, 5 Drawing Sheets

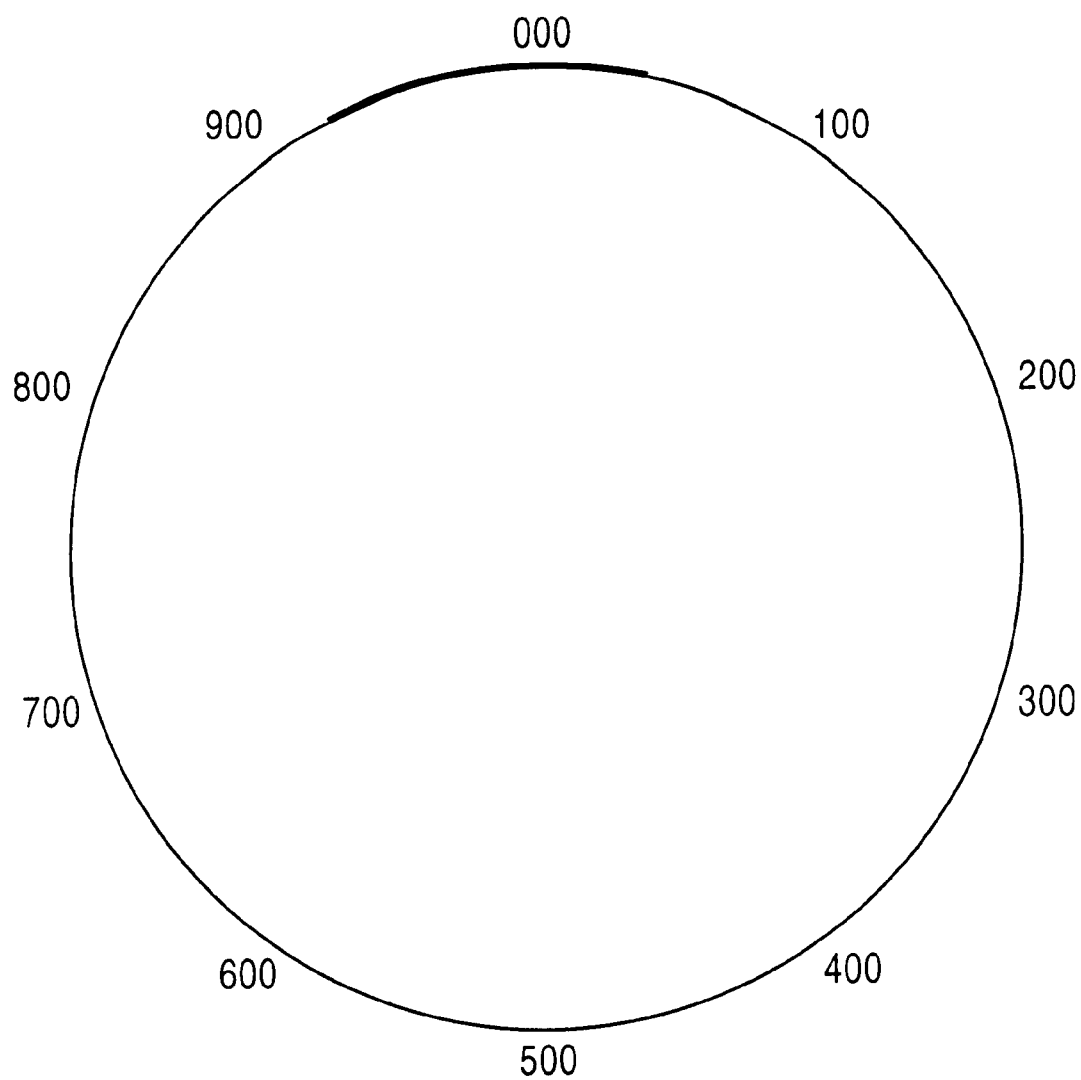

| k | IMAGE FILE |
|---|---|
| 1 | pic941.jpg |
| 2 | pic955.jpg |
| 3 | pic972.jpg |
| 4 | pic004.jpg |
| 5 | pic009.jpg |
| 6 | pic015.jpg |

METHOD FOR ARRANGING IMAGE NUMBERS

BACKGROUND OF THE INVENTION

1. Field of the Invention

This invention relates to a method for arranging image numbers, and more particularly to an image number arranging method, applicable to a digital camera, adapted to arrange, in a predetermined order, record-image numbers having respective numerals in at least part of a range that the numerals are variable in a cyclic loop manner.

2. Description of the Prior Art

The image files, containing image data obtained through photographing by a digital camera, are attached with file numbers different depending on the order of photographing. In a conventional digital camera (1), when an image file is erased, the image file present following the erased image file is renewed in file number. For example, where the image files are given by respective file numbers "001" to "005", when an image file "003" is erased, the image files "004" and "005" are respectively renewed in number to "003" and "004".

On the other hand, another conventional digital camera (2) is arranged to increment the file number each time photographing is performed without erasing the file number. When the file number reaches "999", the file number returns to "000" as a next number.

In the digital camera (1), however, since the file number is updated whenever an image file is erased, the image data is impossible to control by utilizing the file name, despite the images can be reproduced in the photograph order according to the file number. On the other hand, the digital camera (2) can control the image data with using file name because the file number is not renewed. However, it is impossible to reproduce the images in a photograph order after returning the file number to "000".

SUMMARY OF THE INVENTION

Therefore, it is a primary object of this invention to provide a novel method for arranging image numbers.

It is another object of this invention to provide a method for arranging image numbers in which images can be controlled by numbers and reproduced in a desired order.

This invention is a method for arranging, in a predetermined order, recorded-image numbers having respective numerals in at least part of a range that the numerals are variable in a cyclic loop manner, comprising the steps of: (a) arranging the image numbers in a power order; (b) calculating a distance in a predetermined direction of the numerals of predetermined two of the image numbers; (c) detecting the two of the image numbers which are maximum in the distance; and (d) replacing with each other the image number arranged at and before one of the two image numbers detected at the step (c) and the image number arranged at and after the other of the two image numbers detected at the same step.

The recorded-image numbers, having respective numerals in at least part of a range that the numerals are variable in a cyclic loop manner, are first placed in a power order. Then, calculated is a distance in a predetermined direction of the numerals of predetermined two of the image numbers. Two of the image numbers are detected which are maximum in the distance. After detecting the two image number in this manner, replacement is made, with each other, for the image number arranged before one of the two image numbers detected at the step (c) and the image number arranged after the other of the two image numbers detected at the same step.

In one embodiment of this invention, the power order is an order of power ascending order, and the predetermined direction is a direction of the power ascending.

In another embodiment of this invention, the step (b) includes calculating a difference between the numerals of adjacent two of the image numbers, calculating a difference between an added value, added by a predetermined value to a head of the numerals arranged at a head, and a last of the numerals. Incidentally, the predetermined value is at a number of the numerals variable in a cyclic loop manner.

In a further form of this invention, prepared are a first table and a second table for holding the image numbers. The step (a) includes a step of writing the image number into the first table, and the step (d) including a step of writing the image numbers of the first table into the second table.

According to this invention, since the image numbers are replaced with one another depending on the distance assumed by two of the image numbers, the images can be reproduced in a predetermined order according to their image numbers. Also, the images can controlled or managed by their image numbers because the image numbers are not erased.

According to this invention, a digital camera adapted to arrange, in a predetermined order, recorded-image numbers having respective numerals in at least part of a range that the numerals are variable in a cyclic loop manner, comprising: an arranging means for arranging the image numbers in a power order; a calculating means for calculating a distance in a predetermined direction of the numerals of predetermined two of the image numbers; a detecting means for detecting the two of the image numbers which are maximum in the distance; and a replacing means for replacing with each other the image numbers arranged at and before one of the two image numbers detected by the detecting means and the image numbers arranged at and after the other of the two image numbers.

The recorded-image numbers, having respective numerals in at least part of a range that the numerals are variable in a cyclic loop manner, are first placed in a power order. Then, calculated is a distance in a predetermined direction of the numerals of predetermined two of the image numbers. Two of the image numbers are detected which are maximum in the distance. After detecting the two image number in this manner, replacement is made, with each other, for the image number arranged before one of the two image numbers detected at the step (c) and the image number arranged after the other of the two image numbers detected at the same step.

In one embodiment of this invention, the power order is an order of power ascending order, and the predetermined direction is a direction of the power ascending.

In another embodiment of this invention, a difference is first calculated between the numerals of adjacent two of the image numbers, and then a difference in numeral is calculated between an added value, added by a predetermined value to one of the two image numbers arranged at a head, and the other of the two image numbers arranged at a last. Incidentally, the predetermined value is at a number of the numerals variable in a cyclic loop manner.

In a further embodiment of this invention, there are prepared a first table and a second table for holding the image numbers. The arranging means writes the image numbers into the first table, and the replacing means writes the image numbers of the first table into the second table.

According to this invention, since the image numbers are replaced with one another depending on the distance assumed by two of the image numbers, the images can be reproduced in a predetermined order according to their image numbers. Also, the images can controlled or managed by their image numbers because the image numbers are not erased.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 2 is an illustrative view showing part of operation in the FIG. 1 embodiment;

DETAILED DESCRIPTION OF THE PREFERRED EMBODIMENTS

Figure 1:
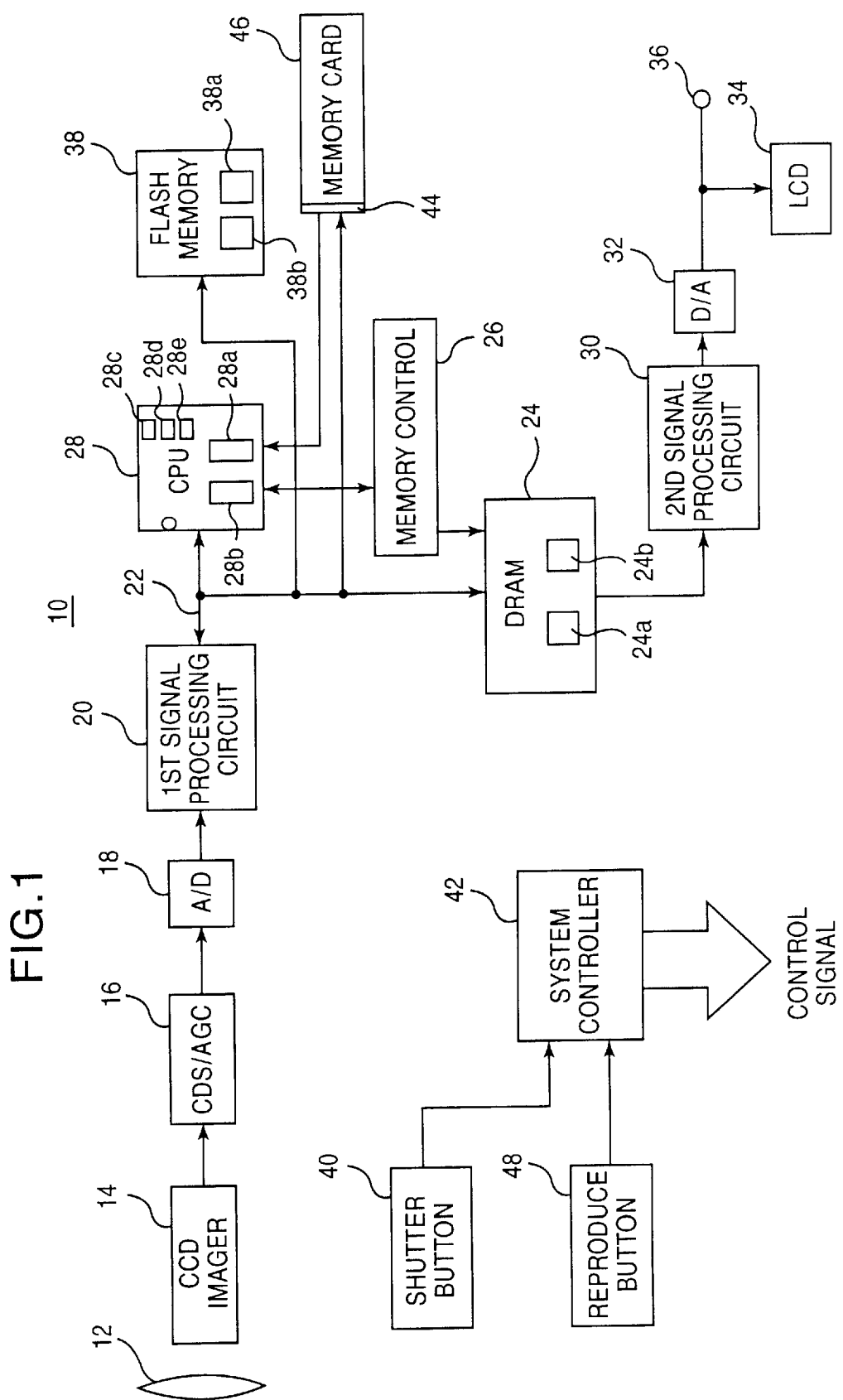
FIG. 1 is a block diagram showing one embodiment of this invention.

Referring to FIG. 1, a digital camera 10 of this embodiment includes a lens 12. An optical image incident upon this lens 12 is given to a CCD imager 14 through a color filter having $C_y$, $Y_e$, $M_g$ and G arranged in a mosaic form.

When outputting a motion picture through a monitor 34, the CCD imager 14 performs so-called well-known pixel mixing readout to supply a resulting pixel signal to CDS/AGC circuit 16. The CDS/AGC circuit 16 performs well-known noise removal and level adjustment on the inputted pixel signal. The pixel signal processed by this CDS/AGC circuit 16 is then converted by an A/D converter 18 into digital data, i.e. pixel data. A first signal processing circuit 20 performs color separation and YUV-conversion on the pixel data outputted from the A/D converter 18.

The Y, U and V data thus created is written by a memory control circuit 26 into a memory area 24a of DRAM 24 through a bus 22. That is, since this data to be written to the memory area 24a is of progressive scan data, the data in its form cannot be outputted through an interlace-scanning schemed LCD 34. For this reason, the memory control circuit 26 temporarily writes the Y, U and V data into the memory area 24a. The Y, U and V data are thereafter read out by the same memory control circuit 26 according to an interlace-scan method.

When outputting a motion picture, the second signal processing circuit 30 performs predetermined horizontal and vertical interpolations on the Y, U and V data (motion picture data) read out of the DRAM 24 so that these data become suited for a display-screen size of the LCD 34. The motion picture data, outputted from the second signal processing circuit 30, is then converted by a D/A converter 32 into an analog signal. This analog signal is supplied to the LCD 34, and also outputted through an output terminal 36. As a result, a motion picture is displayed on the LCD 34.

When a shutter button 40 is depressed by an operator, a system controller 42 controls the CCD imager 14 so as to perform so-called all-pixel readout. The CCD imager 14, outputs pixel signals every other line by the progressive scan method. Since the CCD imager 14 is mounted with a color filter in a mosaic form, $C_y$ and $Y_e$ are alternately outputted at an odd line, while $M_g$ and G are alternately outputted at an even line. The CDS/AGC circuit 16 performs noise removal and level adjustment on the pixel signal, similarly to the above. The A/D converter 18 converts the pixel signal from the CDS/AGC circuit 16 into digital data, i.e. pixel data. The CCD imager 14 is disabled after outputting 1 frame of pixel signals. The 1-frame pixel data created by the A/D converter 18 is directly supplied onto a bus 22 without processed by the first signal processing circuit 20. This 1-frame pixel data is written into the memory area 24a by the memory control circuit 26.

The CPU 28 performs YUV-conversion on the image data stored in the memory area 24a with using a working area 24b. The converted Y, U and V data, i.e. photographed image data, are compressed according to a JPEG format, and the compressed data (compressed image data) is accommodated in an image file "pic00P.jpg" (00P is a file number). The image file is recorded in a memory card 46. Incidentally, in the color separation and the YUV conversion as stated above, adjacent 4 (2×2) pixels of $C_y$, $M_g$, $Y_e$ and G data are used to create 1-pixel Y, U and V data of the 4 pixels, thereby providing Y, U and V data for all the pixels.

The memory control circuit 26 also reads $Y_e$, $C_y$, $M_g$ and G pixel data out of the memory area 24a by the interlace scan method, and supplies them to the second signal processing circuit 30. The second signal processing circuit 30, when the shutter button 40 is depressed, performs color separation and YUV-conversion on the inputted pixel data, thereby outputting a photographed image (freeze image) on the LCD 34.

If a reproduce button 48 is depressed, the CPU 28 first reads out all the image file names recorded on the memory card 46 to enter them to the entry table 28a, and thereafter rearrange these names in a predetermined order. The image file names thus rearranged are entered to an entry table 28b.

The CPU 28 refers to the entry table 28b containing image file names registered in a predetermined order, and reads out desired image-file compressed data. The compressed data is expanded by using the working area 24c. The expanded photographed image data (YUV data) is stored in the memory area 24a, and thereafter read out therefrom by the interlace scanning method. The second signal processing circuit 30 performs horizontal and vertical interpolations on the Y, U and V data read out of the memory area 24a. As a result, a reproduced image is displayed on the LCD 34.

Figures 3A, 3B:
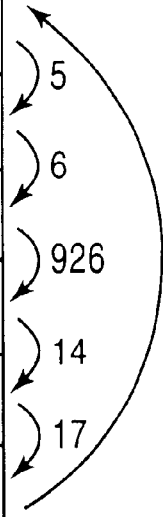
FIG. 3 is an illustrative view showing an entry table.
Figure 4:
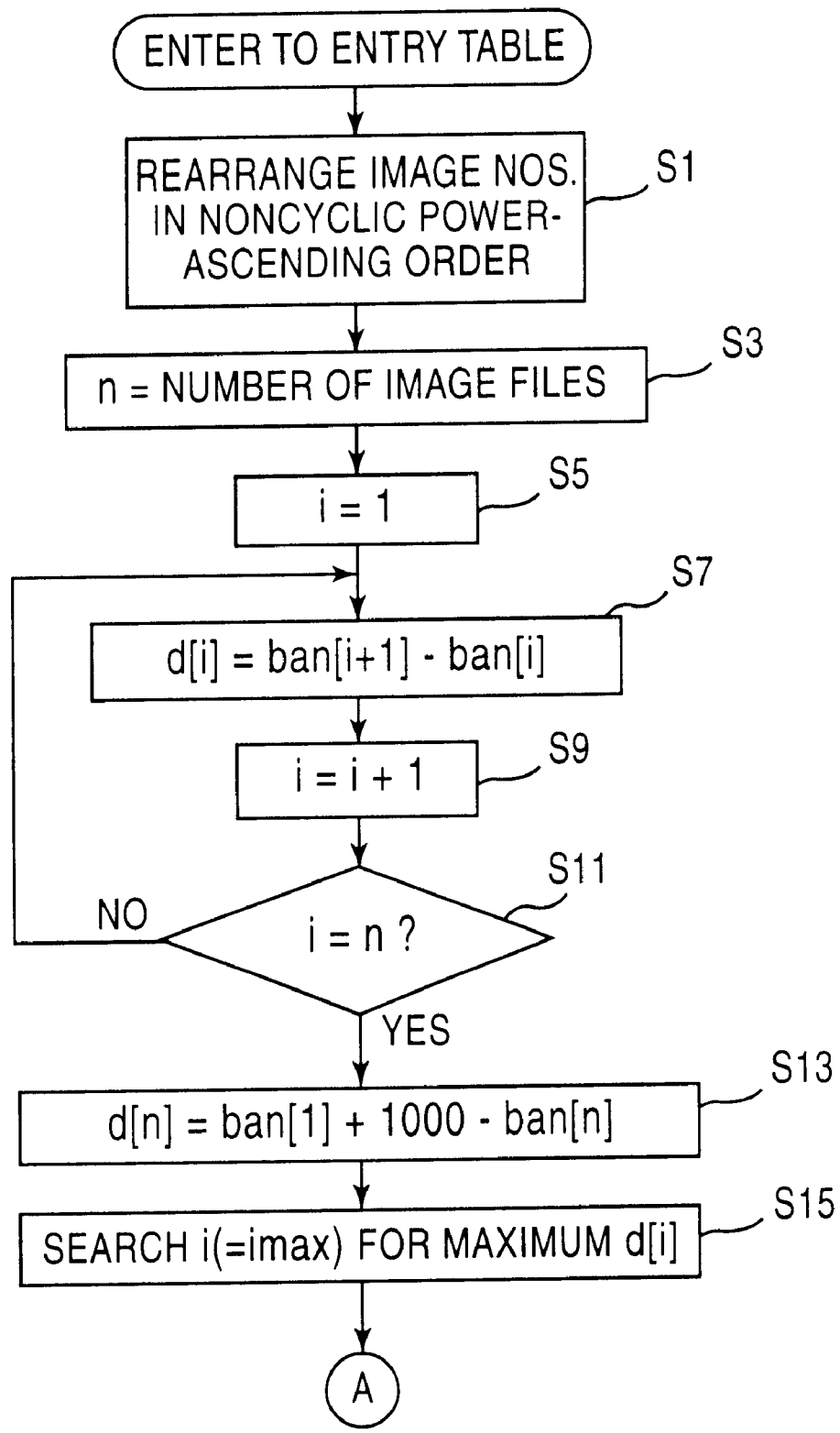
FIG. 4 is a flowchart showing part of operation in the FIG. 1 embodiment.
Figure 5:
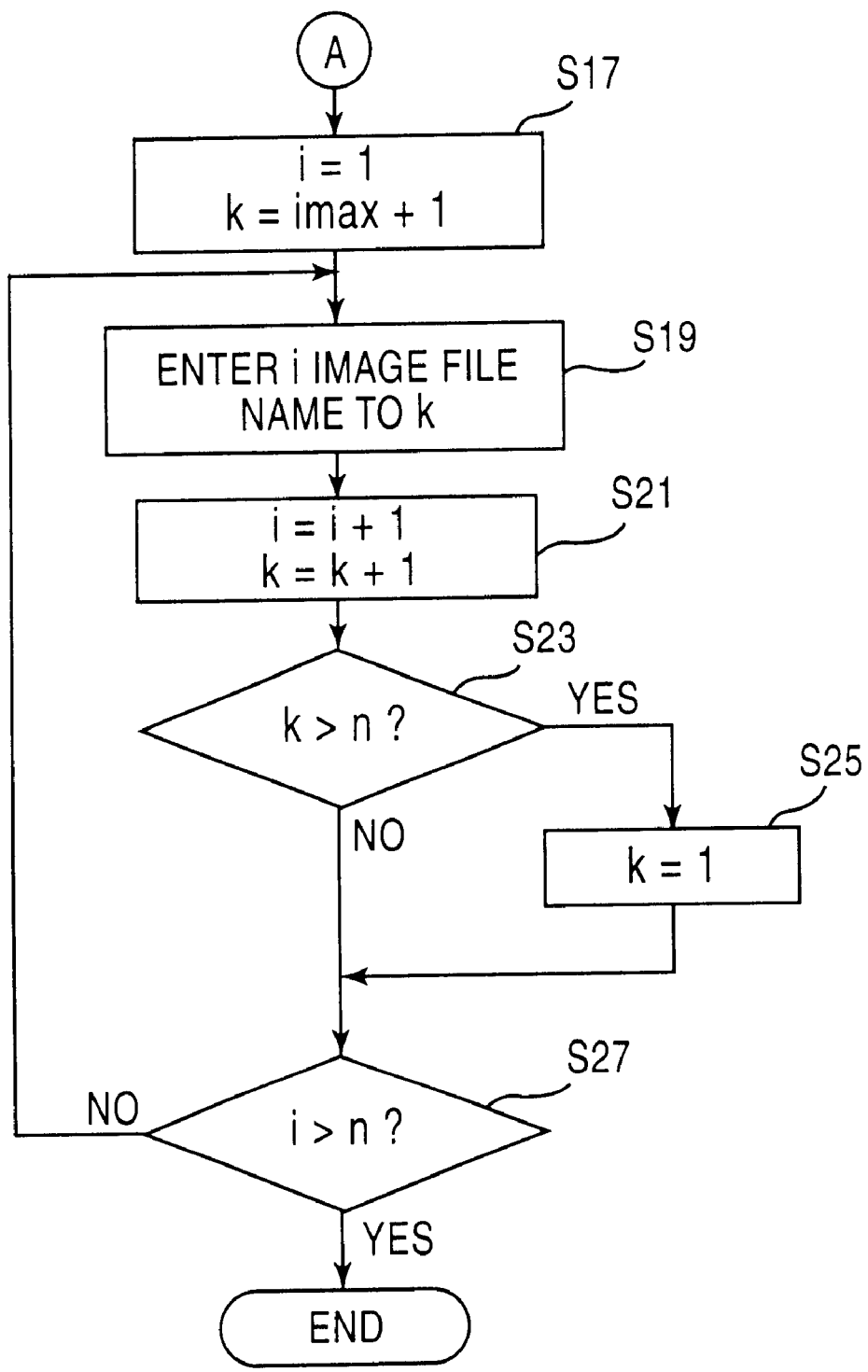
FIG. 5 is a flowchart showing another part of the operation in the FIG. 1 embodiment.

When entering image file names recorded in the memory card 46 to the entry tables 28a and 28b, the CPU 28 performs processing according to flowcharts as shown in FIG. 4 and FIG. 5. First, at a step S1 all the image file names are read out of the memory card 46, and entered to the entry table 28a such that their file numbers are placed in a power-ascending order. Where image files "pic004.jpg", "pic009.jpg", "pic015.jpg", "pic941.jpg", "pic955.jpg", and "pic972.jpg" are recorded in the memory card 46, these six image file names are written into the entry table 28a in a manner of respectively corresponding to i=1–6 as shown in FIG. 3(A). The CPU 28 then sets, at a step S3, the number of all the image files ("6" in this embodiment) to a count value of a counter 28c, and then sets a count value i of a counter 28d at "1" at a step S5.

Subsequently, Equation 1 is calculated at a step S7 to subtract a smaller file number in the entry table 28a from an adjacent greater file number, thereby calculating a difference in each of adjacent file numbers. Due to this, a distance in an advancing direction (power-ascending direction) is determined between two adjacent numbers.

[Equation 1]

$$d[i] = ban[i+1] - ban[i]$$

ban[i+1]: image file number corresponding to i+1
ban[i]: image file number corresponding to i
d[i]: distance between file numbers The CPU 28 thereafter increments, at a step S9, the count value i, and determines at a step S11 whether i=n stands or not. Since the count value n, in this embodiment, is "6", the CPU 28 repeats the process of the step S7 5 times, thereby calculating every difference for all the adjacent two file numbers. In the case of the file numbers shown in FIG. 3(A), the calculated differences are "5", "6", "926", "14" and "17".

When i=n is reached, the CPU 28 determines "YES" at a step S11, and then calculates on Equation 2 at a step S13. This determines a distance from a file number at the last of the entry table 28 to the head file number, i.e. a distance between these numbers in the advancing direction.

[Equation 2]

$$d[n] = ban[1] + 1000 - ban[n]$$

The file number, in this embodiment, is configured by three digits so that the file number, after assigned by "999", is returned to "000". That is, the file number cyclically varies as shown in FIG. 2. Since, in this embodiment, the file numbers of the image files registered are distributed at a portion depicted by a bold line, Equation 2 is calculated in order to determine a distance from "972" to "004". In Equation 2, a last file number is subtracted from a value of a head file number added with "1000". Incidentally, "1000" given in Equation 2 means the number of numerals that can be expressed by 3 digits.

After determining all the distances between the adjacent two file numbers, the CPU searches $i(=i_{max})$ at which the distance d [i] assumes maximum at a step S15. In this embodiment, since a maximum difference is given by the file numbers "015" and "941", $i_{max}=3$ is obtained.

The CPU 28 thereafter processes on a flowchart shown in FIG. 5 in order to rearrange the image file names in order. At a step S17, the count value i is first set at "1", and the count value k of a counter 28e is set at "$i_{max}+1$". At a step S19, an image file name corresponded to the count value i is entered to a site corresponding to the count value k in the entry table 28b. Since i=1 and k=4 in this embodiment, "pic004.jpg" of the entry table 28a is entered into the entry table 28b correspondingly to k=4, as shown in FIG. 3(B).

The CPU 28 subsequently increments, at a step S21, the count values i and k, and determines at a step S23 whether the count value k exceeds over the count value n or not. If "NO", the process directly advances to a step S27, while if "YES", the count value k is set at "1" at a step S25, and the process proceeds to a step S27. Before the determination "NO" at the step S23, three image file names corresponding to i=1–3 are entered into the entry table 28b correspondingly to k=4–6. After the determination "YES" at the step S23, i assumes a value of 4–6 while k takes a value of 1–3. As a result, the image file names corresponding to i=4–6 are respectively placed in correspondence to k=1–3.

Since the CPU determines "NO", at the step S27 before i exceeds over n, the above process is executed. However, when i exceeds over n, the CPU determines "YES" at the step S27, thus ending the process.

In this manner, the image file names registered in the entry table 28a are rearranged as shown in FIG. 3(B). As will be understood from FIG. 3(B), the image file names at and before $i_{max}$ (=3) and those after $i_{max}$ are inversely arranged.

The order of the image-file numbers agrees with the distribution of the file numbers shown by the bold line in FIG. 2.

When the operator depresses the reproduce button 48, the CPU 28 refers to the entry table 28b shown in FIG. 3(B), to reproduce image files. As a result, photographed images are outputted by priority of an older image. This effect is prominently reflected when the photographed images are multi-reproduced. Since in this embodiment the file number is not changed, the image files can be managed or controlled by the file number.

Incidentally, in this embodiment, although the image files were entered in an older order to the entry table 28b, the entry of the image files has in a newer order. In such a case, the image files have to be entered to the entry table 28a such that the file numbers are in a power-descending order.

Also, although this embodiment was explained with using a digital camera for recording still images, this invention is of course applicable to the digital cameras for recording motion pictures.

Further, this embodiment was explained by using the color-compensating filter having $Y_e$, $C_y$, $M_g$ and G arranged in a mosaic form, a primary-color filter having R, G and B arranged in a mosaic form may be employed.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method for arranging, in a predetermined order, recorded-image numbers having respective numerals in at least part of a range that the numerals are variable in a cyclic loop manner, comprising the steps of:
    (a) arranging the image numbers in a power order;
    (b) calculating a distance in a predetermined direction of the numerals of predetermined two of the image numbers;
    (c) detecting the two of the image numbers which are maximum in the distance; and
    (d) replacing the image numbers arranged at and before one of the two image numbers detected at step (c) with the image numbers arranged at and after the other of the two image numbers detected at step (c).

2. A method for arranging image numbers according to claim 1, wherein the power order is a power ascending order, and the predetermined direction is a direction of the power ascending.

3. A method for arranging image numbers according to claim 1, wherein step (b) includes (b-1) calculating a difference between the numerals of adjacent two of the image numbers, and (b-2) calculating a difference in numerals between an added value, added by a predetermined value to one of the two image numbers arranged at a head, and the other of the two image numbers arranged at an end.

4. A method for arranging image numbers according to claim 3, wherein the predetermined value is at a number of the numerals variable in a cyclic loop manner.

5. A method for arranging image numbers according to claim 1, further comprising steps of: (e) preparing a first table and a second table for holding the image numbers, wherein the step (a) includes a step of (a-1) writing the image numbers into the first table, and the step (d) including a step of (d-1) writing the image numbers of the first table into the second table.

6. A digital camera adapted to arrange, in a predetermined order, recorded-image numbers having respective numerals in at least part of a range that the numerals are variable in a cyclic loop manner, comprising:

an arranger for arranging the image numbers in a power order;

a calculator for calculating a distance in a predetermined direction of the numerals of predetermined two of the image numbers;

a detector for detecting the two of the image numbers which are maximum in the distance; and a replacer for replacing the image numbers arranged at and before one of the two image numbers detected by said detector with the image numbers arranged at and after the other of the two image numbers.

7. A digital camera according to claim 6, wherein the power order is a power ascending order, and the predetermined direction is a direction of the power ascending.

8. A digital camera according to claim 6, wherein said calculator includes a first difference calculator for calculating a difference between the numerals of adjacent two of the image numbers, and second difference calculator for calculating a difference in numerals between an added value, added by a predetermined value to one of the two image numbers arranged at a head, and the other of the two image numbers arranged at an end.

9. A digital camera according to claim 8, wherein the predetermined value is at a number of the numerals variable in a cyclic loop manner.

10. A digital camera according to claim 6, further comprising a first table and a second table for holding the image numbers, wherein said arranger includes a first writer for writing the image numbers into the first table, and said replacer including a second writer for writing the image numbers of the first table into the second table.

* * * * *